United States Patent
Dudda et al.

(10) Patent No.: US 11,356,213 B2
(45) Date of Patent: Jun. 7, 2022

(54) NR RLC SEGMENT CONCATENATION

(71) Applicant: Telefonaktiebolaget LM Ericsson (publ), Stockholm (SE)

(72) Inventors: Torsten Dudda, Aachen (DE); Jani-Pekka Kainulainen, Kirkkonummi (FI); Jose Luis Pradas, Stockholm (SE); Samir Shah, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 16/968,303

(22) PCT Filed: Feb. 13, 2019

(86) PCT No.: PCT/EP2019/053488
§ 371 (c)(1),
(2) Date: Aug. 7, 2020

(87) PCT Pub. No.: WO2019/158552
PCT Pub. Date: Aug. 22, 2019

(65) Prior Publication Data
US 2021/0036812 A1 Feb. 4, 2021

Related U.S. Application Data

(60) Provisional application No. 62/630,641, filed on Feb. 14, 2018, provisional application No. 62/750,032, filed on Oct. 24, 2018.

(51) Int. Cl.
*H04L 1/18* (2006.01)
*H04L 1/00* (2006.01)
(52) U.S. Cl.
CPC .......... *H04L 1/1867* (2013.01); *H04L 1/0084* (2013.01)

(58) Field of Classification Search
CPC ..... H04L 1/1867; H04L 1/0084; H04W 84/04
See application file for complete search history.

(56) References Cited

U.S. PATENT DOCUMENTS

2010/0208655 A1* 8/2010 Kim .................. H04L 69/04
370/328
2010/0309803 A1* 12/2010 Toh ..................... H04L 1/0006
370/252

(Continued)

FOREIGN PATENT DOCUMENTS

WO 2009099369 A1 8/2009

OTHER PUBLICATIONS

Ericsson, "RLC Status Report format and Polling", 3GPP TSG-RAN WG2 #99bis, Prague, Czech Republic, Oct. 9, 2017, pp. 1-7, Tdoc R2-1711250, 3GPP.

(Continued)

*Primary Examiner* — Christine Ng
(74) *Attorney, Agent, or Firm* — Coats + Bennett, PLLC

(57) ABSTRACT

Transmitters consider the size of a gap segment adjacent to at least one negatively acknowledged (NACKed) Radio Link Control (RLC) Service Data Unit (SDU) when considering when and/or how to concatenate one or more NACKed SDU segments for retransmission. Depending on which RLC SDU segment(s) is/are NACKed, e.g., considering the size of NACKed segments in relation to Protocol Data Unit (PDU) header size(s) needed, the transmitter implements a single RLC SDU retransmission or multiple RLC SDU segment retransmissions. In so doing, the solution presented herein not only defines how such transmissions occur, but also provides improved efficiency when retransmitting such NACKed SDU segments.

20 Claims, 13 Drawing Sheets

(56) References Cited

U.S. PATENT DOCUMENTS

2010/0329126 A1* 12/2010 van Gassel ......... H04L 43/0829
370/242
2018/0254826 A1* 9/2018 Jungnickel ............ H04W 36/30
2019/0052409 A1* 2/2019 Kainulainen ......... H04W 24/10
2020/0344174 A1* 10/2020 Zou ........................ H04L 69/28

OTHER PUBLICATIONS

3rd Generation Partnership Project, "3rd Generation Partnership Project; Technical Specification Group Radio Access Network; NR; Radio Link Control (RLC) protocol specification (Release 15)", Technical Specification, 3GPP TS 38.322 V15.0.0, Dec. 1, 2017, pp. 1-32, 3GPP, France.

3rd Generation Partnership Project, "3rd Generation Partnership Project; Technical Specification Group Radio Access Network; NR; NR and NG-RAN Overall Description; Stage 2 (Release 15)", Technical Specification, 3GPP TS 38.300 V15.0.0, Dec. 1, 2017, pp. 1-68, 3GPP, France.

\* cited by examiner

NR RLC SEGMENT CONCATENATION

RELATED APPLICATION

This application claims priority to U.S. Provisional Application No. 62/630,641, filed 14 Feb. 2018, and U.S. Provisional Application No. 62/750,032, filed 24 Oct. 2018. The disclosures of each of these applications are incorporated in their entireties by reference herein.

TECHNICAL FIELD

The solution presented herein relates generally to retransmissions of NACKed SDU segments, and more particularly to controlling when to, and when not to, concatenate one or more NACKed SDU segments.

BACKGROUND

The solution presented herein is described within the context of 3rd Generation Partnership Project (3GPP) Next Radio (NR) radio technology (e.g., 3GPP TS 38.300 V15.0.0 (2017-12)). Those skilled in the art will understand that the problems and solutions described herein are equally applicable to wireless access networks and user-equipments (UEs) implementing other access technologies and standards. NR is used as an exemplary technology where suitable for the solution, and using NR in the description therefore is particularly useful for understanding the problem and solutions solving the problem. In particular, the solution presented herein is applicable also to 3GPP Long Term Evolution (LTE), or 3GPP LTE and NR integration, also denoted as non-standalone NR, or EN-DC (Evolved Universal Mobile Telecommunication System NR (EUTRA-NR) Dual Connectivity).

NR Radio Link Control (RLC) (cf. 3GPP TS 38.322 V15.0.0 (2017-12)) defines the RLC protocol. Higher layer Service Data Units (SDUs) are encapsulated in Protocol Data Units (PDUs) for transmission. Segmentation of the SDUs is applied if the SDU cannot fit into the transport block size for the transmission of the PDU. In Acknowledged Mode (AM), the receiver sends a status report about reception status of the SDUs and SDU segments to the transmitter. Responsive to the status report, the transmitter does retransmissions of SDUs or SDU segments. Re-segmentation may need to be applied if an SDU segment needs to be retransmitted, but does not fit into the new transport block size for retransmission. There currently exist certain challenge(s). It is currently unclear how the transmitting RLC entity applies re-segmentation when multiple SDU segments are considered for retransmission.

SUMMARY

The solution presented herein considers the size of a gap segment adjacent to at least one NACKed SDU segment when considering when and/or how to concatenate one or more NACKed SDU segments for retransmission. In so doing, the solution presented herein not only defines how such transmissions occur, but also provides improved efficiency when retransmitting such NACKed SDU segments.

Certain aspects of the present disclosure and their embodiments may provide solutions to these or other challenges. The object of the solution presented herein is to provide an RLC retransmission scheme in which the RLC transmitter considers negative-acknowledgements (NACKs) for multiple RLC SDU segments for some RLC SDU in a way that the retransmissions of the NACKed segments are carried out with a minimum overhead. Depending on which RLC SDU segments are NACKed, e.g., considering their size in relation to PDU header sizes needed, either a single RLC SDU retransmission or multiple RLC SDU segment retransmissions are carried out. The solution presented herein can also be described as a method for RLC SDU segment concatenation, where concatenation of RLC SDU segments is considered for retransmission, until a certain condition. For example, concatenation may be considered for conditions related to which RLC SDU segments receive negative acknowledgements, in relation to full RLC SDU size and transport block size for retransmission.

Certain embodiments may provide one or more of the following technical advantage(s). One advantage is reduced overhead of retransmissions that potentially require re-segmentation. Another advantage is lower retransmission delays. Further, due to the overhead reduction, system capacity and achievable throughput may be increased.

One exemplary embodiment comprises a method performed by a transmitter for transmitting a Radio Link Protocol (RLC) Service Data Unit (SDU) to a receiver in wireless communication with the transmitter. The method comprises transmitting a plurality of segments to the receiver, where each of the segments comprises one or more bytes of the SDU. The method further comprises receiving at least one NACK from the receiver identifying a corresponding negatively acknowledged segment, where each negatively acknowledged segment comprises one of the plurality of transmitted segments for which the transmitter received the NACK. The method further comprises identifying a gap segment adjacent to at least one of the negatively acknowledged segments. The gap segment comprises at least one non-negatively acknowledged segment. The method further comprises generating at least one retransmission packet responsive to a size of the gap segment, where each of the at least one retransmission packets comprises a header and at least one of the negatively acknowledged segments, and transmitting the retransmission packet(s) to the receiver. In one exemplary embodiment, the transmitter receives a first NACK identifying a first negatively acknowledged segment for the SDU, and receives a second NACK identifying a second negatively acknowledged segment for the SDU. The first and second negatively acknowledged segments are adjacent to, and spaced within the SDU by, the gap segment. For this exemplary embodiment, the transmitter may generate a retransmission packet comprising the header, the gap segment, and the first and second negatively acknowledged segments when a size of the header exceeds the size of the gap segment. Alternatively, for this exemplary embodiment, the first negatively acknowledged segment may correspond to a first segment of the SDU and the second negatively acknowledged segment may correspond to any other segment of the SDU, where a first header associated with a retransmission of the first negatively acknowledged segment has a first header size and a second header associated with a separate retransmission of the second negatively acknowledged segment has a second header size larger than the first header size. In this case, the transmitter may generate the retransmission packet(s) to comprise the first header, the gap segment, and the first and second negatively acknowledged segments when the second header size exceeds the size of the gap segment.

In another exemplary embodiment, the transmitter receives a first NACK identifying a first negatively acknowledged segment of the SDU, a second NACK identifying a second negatively acknowledged segment of the SDU adjacent the first negatively acknowledged segment and adjacent the gap segment, and a third NACK identifying a third negatively acknowledged segment of the SDU adjacent to the gap segment, where the second and third negatively acknowledged segments are spaced within the SDU by the gap segment. For this example, the transmitter may generate a retransmission packet comprising the header, the gap segment, and the first, second, and third negatively acknowledged segments when a size of the header exceeds the size of the gap segment, and generate first and second retransmission packets when the size of the gap segment exceeds the size of the header, where the first retransmission packet comprises the header and the first and second negatively acknowledged segments and the second retransmission packet comprising the header and the third negatively acknowledged segment. In another example, the first negatively acknowledged segment corresponds to a first segment of the SDU and the second and third negatively acknowledged segments correspond to any other segments of the SDU, where a first header associated with a retransmission of the first negatively acknowledged segment has a first header size and a second header associated with a separate retransmission of the second or third negatively acknowledged segments has a second header size larger than the first header size. For this exemplary embodiment, the transmitter generates a retransmission packet comprising the first header, the gap segment, and the first, second, and third negatively acknowledged segments when the second header size exceeds the size of the gap segment, and generates first and second retransmission packets when the size of the gap segment exceeds the second header size, where the first retransmission packet comprising the first header and the first and second negatively acknowledged segments and the second retransmission packet comprising the second header and the third negatively acknowledged segment.

In some embodiments, the gap may be at a beginning or end of the SDU. For example, the gap may be between the negatively acknowledged segment and the end of the SDU. When the gap segment comprises at least one segment that has not yet been acknowledged or negatively acknowledged, and when the transmitter anticipates that the at least one segment in the gap segment that has not yet been acknowledged or negatively acknowledged will be negatively acknowledged, the transmitter generates the at least one retransmission packet comprising the header, the gap segment, and the at least one of the negatively acknowledged segments responsive to the anticipation. In another example, the gap segment includes a first segment of the SDU and wherein each negatively acknowledged segment comprises one of the plurality of segments following the first segment of the SDU. In this example, where a first header associated with a retransmission including the first segment has a first header size and a second header associated with a separate retransmission that does not include the first segment has a second header size larger than the first header size, the transmitter generates a retransmission packet comprising the first header, the gap segment, and one or more of the negatively acknowledged segments when the second header size exceeds the size of the gap segment, and generates a retransmission packet comprising the second header and one or more of the negatively acknowledged segments when the size of the gap segment exceeds the second header size.

In one exemplary embodiment, the transmitter generates a retransmission packet comprising two or more negatively acknowledged segments when a size of the header exceeds the size of the gap segment, wherein two of the two or more negatively acknowledged segments are adjacent to and separated by the gap segment.

In one exemplary embodiment, each of the at least one non-negatively acknowledged segments of the gap segment comprises a not yet transmitted segment of the SDU, an already acknowledged segment of the SDU, or a transmitted segment of the SDU that has not yet been acknowledged or negatively acknowledged.

In one exemplary embodiment, the gap segment includes a first segment of the SDU and each negatively acknowledged segment comprises one of the plurality of segments following the first segment of the SDU. For this embodiment, when a first header associated with a retransmission including the first segment has a first header size and a second header associated with a separate retransmission that does not include the first segment has a second header size larger than the first header size, the transmitter generates a retransmission packet comprising the first header, the gap segment, and one or more of the negatively acknowledged segments when the second header size exceeds the size of the gap segment, generates a retransmission packet comprising the second header and one or more of the negatively acknowledged segments when the size of the gap segment exceeds the second header size.

In one exemplary embodiment, the transmitter generates a retransmission packet comprising two or more negatively acknowledged segments when a size of the header exceeds the size of the gap segment, where two of the two or more negatively acknowledged segments are adjacent to and separated by the gap segment.

In one exemplary embodiment, each of the at least one non-negatively acknowledged segments of the gap segment comprises a not yet transmitted segment of the SDU, an already acknowledged segment of the SDU, or a transmitted segment of the SDU that has not yet been acknowledged or negatively acknowledged.

In one exemplary embodiment, when the gap segment comprises at least one segment that has not yet been acknowledged or negatively acknowledged and when the transmitter anticipates that the at least one segment in the gap segment that has not yet been acknowledged or negatively acknowledged will be negatively acknowledged, the transmitter generates at least one retransmission packet comprising the header, the gap segment, and the at least one of the negatively acknowledged segments responsive to the anticipation.

In one exemplary embodiment, the transmitter is comprised in a wireless device.

In one exemplary embodiment, the transmitter is comprised in a base station.

One exemplary embodiment comprises a transmitter in wireless communication with a receiver. The transmitter comprises processing circuitry configured to transmit a Radio Link Protocol (RLC) Service Data Unit (SDU) to a receiver in wireless communication with the transmitter. To that end, the processing circuitry is configured to transmit a plurality of segments to the receiver, where each of the segments comprises one or more bytes of the SDU. The processing circuitry is further configured to receive at least one NACK from the receiver identifying a corresponding negatively acknowledged segment, where each negatively acknowledged segment comprises one of the plurality of transmitted segments for which the transmitter received the NACK. The processing circuitry is further configured to identify a gap segment adjacent to at least one of the negatively acknowledged segments. The gap segment comprises at least one non-negatively acknowledged segment.

The processing circuitry is further configured to generate at least one retransmission packet responsive to a size of the gap segment, where each of the at least one retransmission packets comprises a header and at least one of the negatively acknowledged segments, and transmit the retransmission packet(s) to the receiver.

One exemplary embodiment comprises a transmitter in wireless communication with a receiver. The transmitter is configured to transmit a Radio Link Protocol (RLC) Service Data Unit (SDU) to a receiver in wireless communication with the transmitter, where the transmitter comprises a transmitter unit/circuit/module, a receiver unit/circuit/module, a gap unit/circuit/module, and a retransmission packet unit/circuit/module. The transmitter unit/circuit/module is configured to transmit a plurality of segments to the receiver, where each of the segments comprises one or more bytes of the SDU. The receiver unit/circuit/module is configured to receive at least one NACK from the receiver identifying a corresponding negatively acknowledged segment, where each negatively acknowledged segment comprises one of the plurality of transmitted segments for which the transmitter received the NACK. The gap unit/circuit/module is configured to identify a gap segment adjacent to at least one of the negatively acknowledged segments. The gap segment comprises at least one non-negatively acknowledged segment. The retransmission unit/circuit/module is configured to generate at least one retransmission packet responsive to a size of the gap segment, where each of the at least one retransmission packets comprises a header and at least one of the negatively acknowledged segments. The transmitter unit/circuit/module is further configured to transmit the retransmission packet(s) to the receiver.

One exemplary embodiment comprises a computer program product for controlling a wireless transmitter. The computer program product comprises software instruction that, when run on at least one processing circuit in the wireless transmitter, causes the wireless transmitter to transmit a Radio Link Protocol (RLC) Service Data Unit (SDU) to a receiver in wireless communication with the transmitter. To that end, the software instructions, when run on the at least one processing circuit, causes the wireless transmitter to transmit a plurality of segments to the receiver, where each of the segments comprises one or more bytes of the SDU. The software instructions, when run on the at least one processing circuit, further causes the wireless transmitter to receive at least one NACK from the receiver identifying a corresponding negatively acknowledged segment, where each negatively acknowledged segment comprises one of the plurality of transmitted segments for which the transmitter received the NACK. The software instructions, when run on the at least one processing circuit, further causes the wireless transmitter to identify a gap segment adjacent to at least one of the negatively acknowledged segments. The gap segment comprises at least one non-negatively acknowledged segment. The software instructions, when run on the at least one processing circuit, further causes the wireless transmitter to generate at least one retransmission packet responsive to a size of the gap segment, where each of the at least one retransmission packets comprises a header and at least one of the negatively acknowledged segments, and to transmit the retransmission packet(s) to the receiver. In some embodiments, a computer-readable medium comprises the computer program product. In some embodiments, the computer-readable medium comprises a non-transitory computer-readable medium.

DETAILED DESCRIPTION

Figure 1:
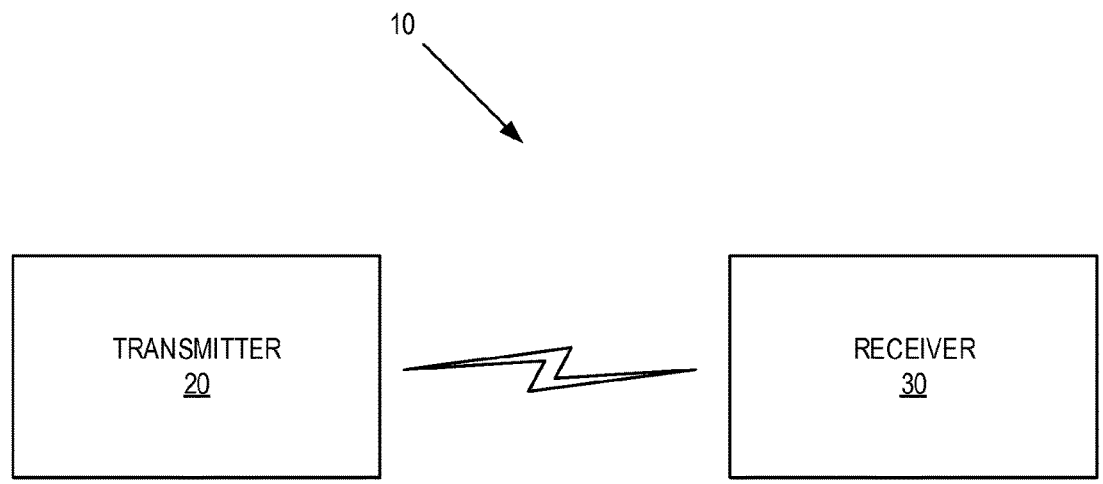
FIG. 1 shows an exemplary wireless communication wireless network.

FIG. 1 shows an exemplary wireless network 10 comprising a transmitter 20 and a receiver 30. The transmitter 20 and receiver 30 wirelessly communicate according to any known wireless communication standard. In some embodiments, the transmitter 20 is comprised in a network node, e.g., base station, that transmits downlink wireless signals to the receiver 30 and receives uplink wireless signals from the receiver 30. In other embodiments, the transmitter 20 is comprised in a wireless device, e.g., User Equipment (UE), that transmits uplink wireless signals to the receiver 30 and receives downlink wireless signals from the receiver 30.

Figure 3:
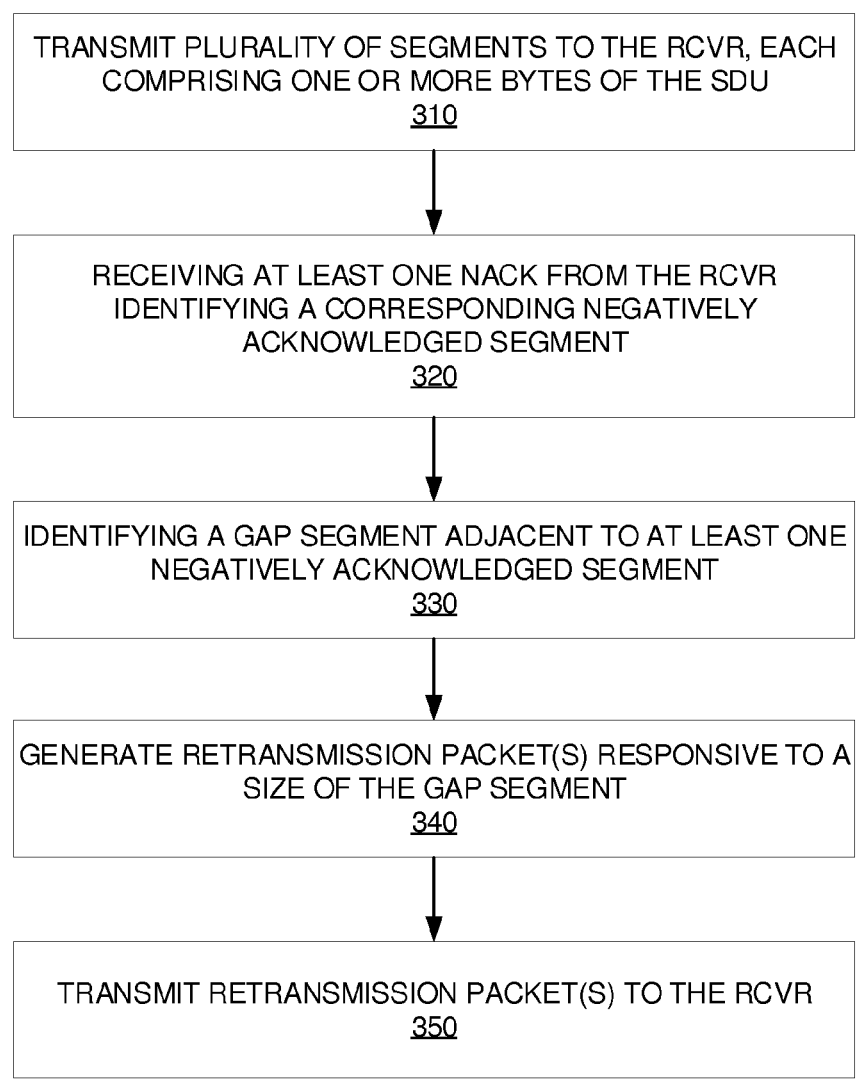
FIG. 3 shows an exemplary method performed by a transmitter according to an exemplary embodiment.

FIG. 3 depicts a method 300 in accordance with particular embodiments implemented by the transmitter 20 of FIG. 1. The method is implemented by transmitter 20 for transmitting a Radio Link Protocol (RLC) Service Data Unit (SDU) to a receiver 30 in wireless communication with the transmitter 20. The method 300 comprises transmitting a plurality of segments to the receiver 30, where each of the segments comprises one or more bytes of the SDU (block 310). The method 300 further comprises receiving at least one NACK from the receiver 30 identifying a corresponding negatively acknowledged segment (block 320). Each negatively acknowledged segment comprises one of the plurality of transmitted segments for which the transmitter 20 received the NACK. The method 300 further comprises identifying a gap segment adjacent to at least one of the negatively acknowledged segments (block 330). The gap segment comprises at least one non-negatively acknowledged segment. The method 300 further comprises generating at least one retransmission packet responsive to a size of the gap segment (block 340). Each of the retransmission packet(s) comprises a header and at least one of the negatively acknowledged segments. The method 300 further comprises transmitting the retransmission packet(s) to the receiver 30 (block 350).

As used herein, a gap segment is a segment of the SDU, adjacent to at least one negatively acknowledged segment, that has not been negatively acknowledged. For example, a gap segment could be a segment of the SDU that has been explicitly acknowledged, a segment of the SDU that is assumed acknowledged because a NACK has not been received for it (implicitly acknowledged), and/or a segment that has not even been transmitted yet.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

The solution presented herein applies to any wireless transmitter 20 operating in a wireless network 10. Such transmitters 20 may be included in any wireless node, including but not limited to a wireless device (e.g., UE) or a network node (e.g., a base station).

Figure 4:
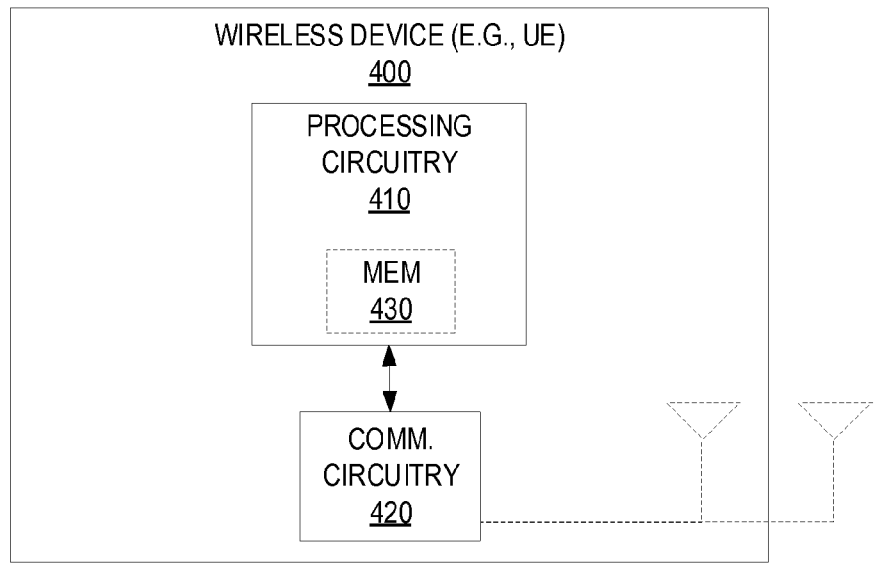
FIG. 4 shows a block diagram of a wireless device according to one exemplary embodiment.

FIG. 4, for example, shows a wireless device 400 as implemented in accordance with one or more embodiments. As shown, the wireless device 400 includes processing circuitry 410 and communication circuitry 420. The communication circuitry 420 (e.g., radio circuitry), which includes the transmitter disclosed herein, is configured to transmit and/or receive information to and/or from one or more other nodes, e.g., via any communication technology. Such communication may occur via one or more antennas that are either internal or external to the wireless device 400. The processing circuitry 410 and communication circuitry 420 are collectively configured to perform processing described above, such as by executing instructions stored in memory 430. The processing circuitry 410 and/or communication circuitry 420 in this regard may implement certain functional means, units, or modules.

Figure 5:
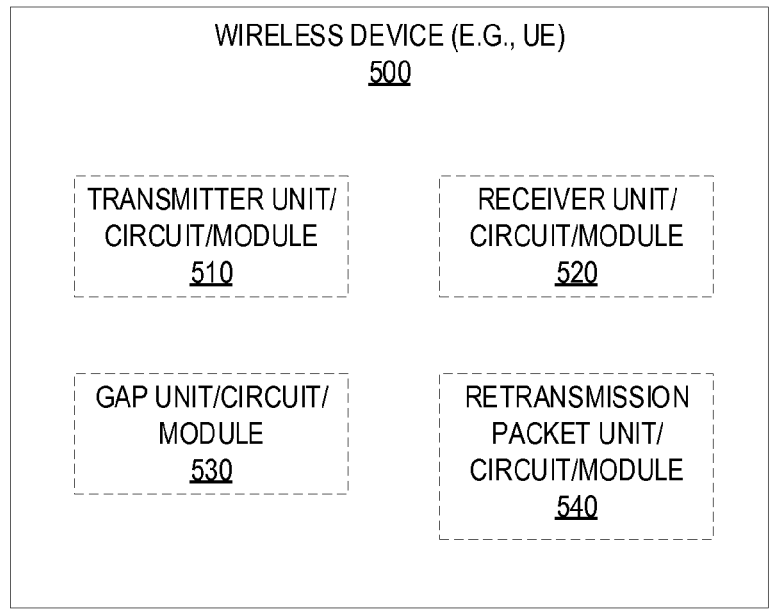
FIG. 5 shows block diagram of a wireless device according to another exemplary embodiment.
Figure 8:
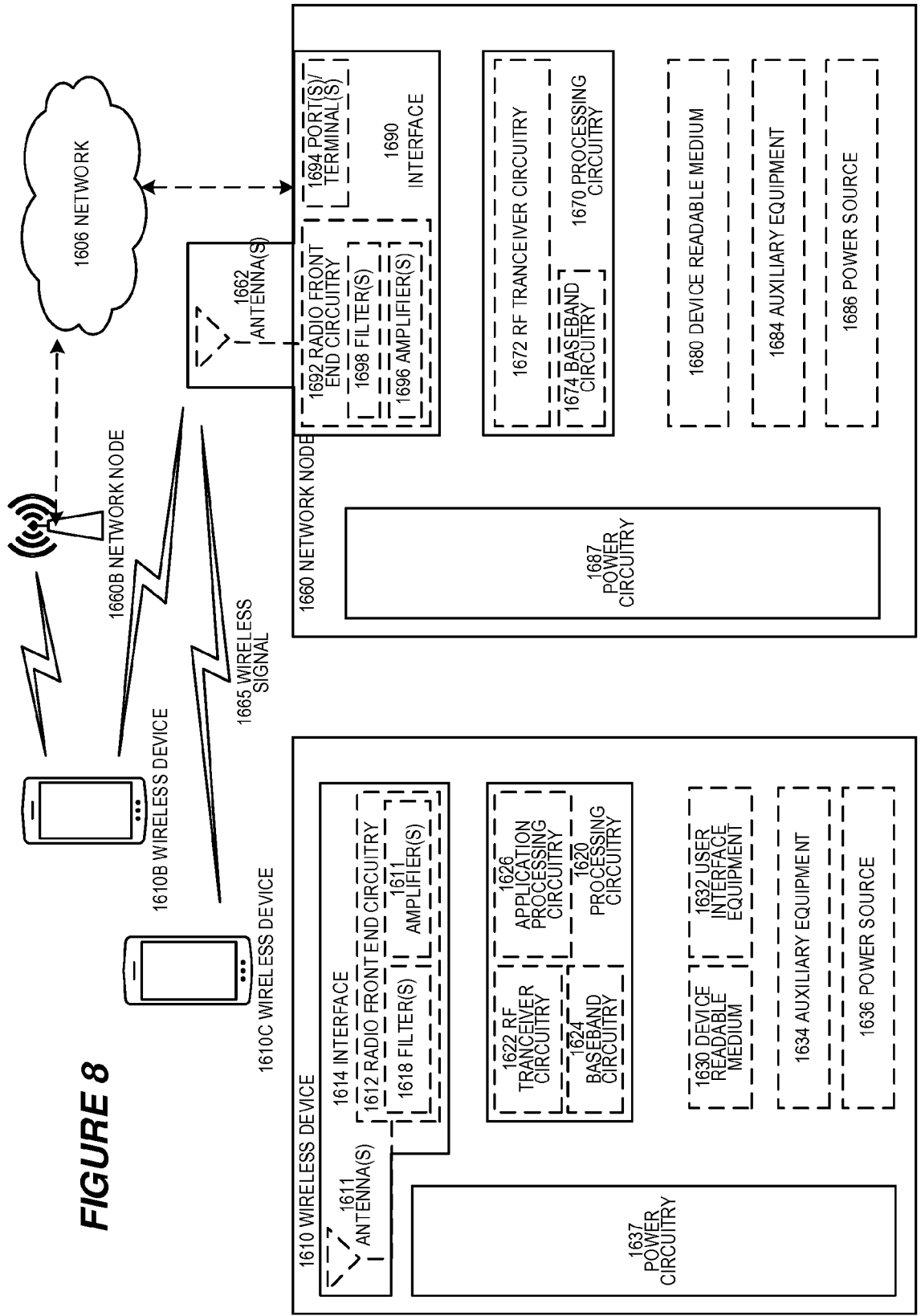
FIG. 8 shows an exemplary wireless network applicable to the solution presented herein.

FIG. 5 illustrates a schematic block diagram of a wireless device 500 in a wireless network according to still other embodiments (for example, the wireless network shown in FIG. 8). As shown, the wireless device 500 implements various functional means, units, circuits, or modules, e.g., via the processing circuitry 410 in FIG. 4 and/or via software code. These functional means, units, circuits, or modules, e.g., for implementing the method(s) herein, include for instance: transmitter unit/circuit/module 510, receiver unit/circuit/module 520, gap unit/circuit/module 530, and retransmission packet unit/circuit/module 540. The transmitter unit/circuit/module 510 is configured to transmit a plurality of segments to the receiver 30, where each of the segments comprises one or more bytes of the SDU. The receiver unit/circuit/module 520 is configured to receive at least one NACK from the receiver 30 identifying a corresponding negatively acknowledged segment, where each negatively acknowledged segment comprises one of the plurality of transmitted segments for which the transmitter unit/circuit/module 510 received the NACK. The gap unit/circuit/module 530 is configured to identify a gap segment adjacent to at least one of the negatively acknowledged segments. The gap segment comprises at least one non-negatively acknowledged segment. The retransmission packet unit/circuit/module 540 is configured to generate at least one retransmission packet responsive to a size of the gap segment, where each of the at least one retransmission packets comprises a header and at least one of the negatively acknowledged segments. The transmitter unit/circuit/module 510 is further configured to transmit the at least one retransmission packet to the receiver 30.

Figure 6:
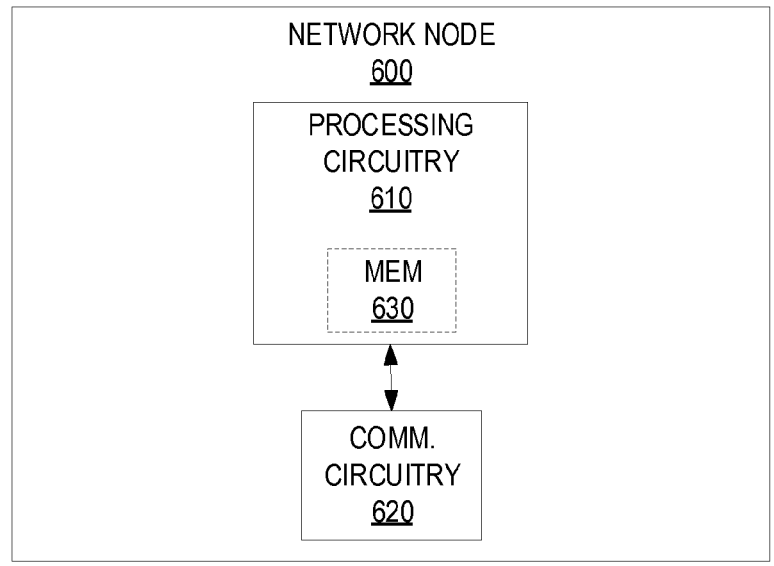
FIG. 6 shows a block diagram of a network node according to one exemplary embodiment.

FIG. 6 illustrates a network node 600 as implemented in accordance with one or more embodiments. As shown, the network node 600 includes processing circuitry 610 and communication circuitry 620. The communication circuitry 620, which includes the transmitter disclosed herein, is configured to transmit and/or receive information to and/or from one or more other nodes, e.g., via any communication technology. The processing circuitry 610 and communication circuitry 620 are collectively configured to perform processing described above, such as by executing instructions stored in memory 630. The processing circuitry 610 and/or communication circuitry 620 in this regard may implement certain functional means, units, circuits, or modules.

Figure 7:
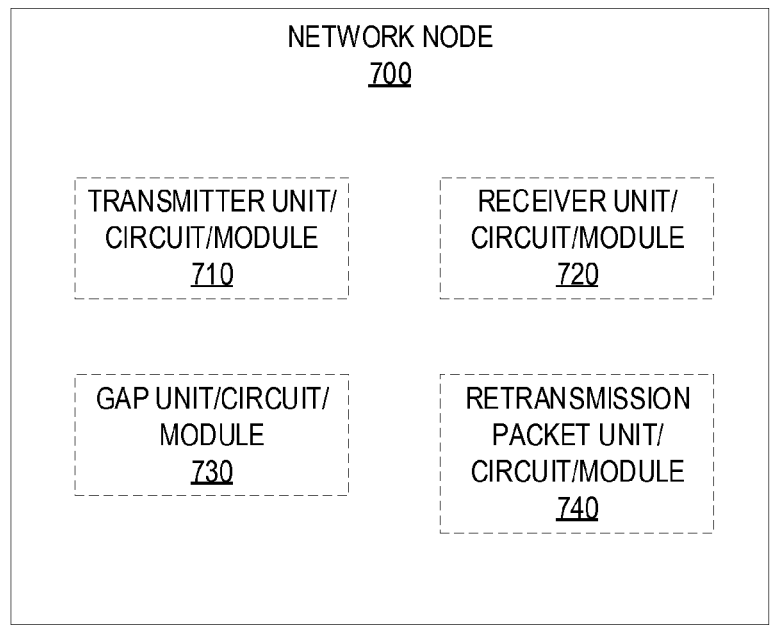
FIG. 7 shows a block diagram of a network node according to another exemplary embodiment.

FIG. 7 illustrates a schematic block diagram of a network node 700 in a wireless network according to still other embodiments (for example, the wireless network shown in FIG. 8). As shown, the network node 700 implements various functional means, units, circuits, or modules, e.g., via the processing circuitry 610 in FIG. 6 and/or via software code. These functional means, units, circuits, or modules, e.g., for implementing the method(s) herein, include for instance: transmitter unit/circuit/module 710, receiver unit/circuit/module 720, gap unit/circuit/module 730, and retransmission packet unit/circuit/module 740. The transmitter unit/circuit/module 710 is configured to transmit a plurality of segments to the receiver 30, where each of the segments comprises one or more bytes of the SDU. The receiver unit/circuit/module 720 is configured to receive at least one NACK from the receiver 30 identifying a corresponding negatively acknowledged segment, where each negatively acknowledged segment comprises one of the plurality of transmitted segments for which the transmitter unit/circuit/module 710 received the NACK. The gap unit/circuit/module 730 is configured to identify a gap segment adjacent to at least one of the negatively acknowledged segments. The gap segment comprises at least one non-negatively acknowledged segment. The retransmission packet unit/circuit/module 740 is configured to generate at least one retransmission packet responsive to a size of the gap segment, where each of the at least one retransmission packets comprises a header and at least one of the negatively acknowledged segments. The transmitter unit/circuit/module 710 is further configured to transmit the at least one retransmission packet to the receiver 30.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 2:
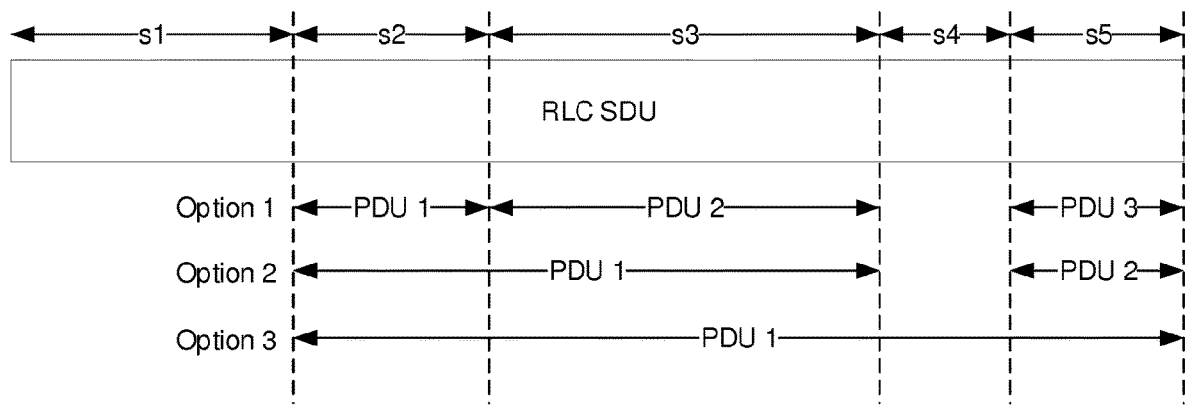
FIG. 2 shows an exemplary RLC SDU, as well as multiple options for retransmitting NACKed segments.

The following describes an exemplary implementation of the solution presented herein with the help of FIG. 2. As shown in the example of FIG. 2, an RLC SDU had been segmented into 5 segments, s1-s5, and the transmitter 20 has transmitted those segments to the receiver 30. In the example, one or multiple status reports are received indicating that s2, s3, and s5 are missing, i.e. negatively-acknowledged (Nacked), and thus the data bytes associated with those segments should be considered for retransmission.

How much data is retransmitted by the transmitter 20 depends on the transport block size for transmission. It is assumed in the following description that the transport block size is sufficiently large for retransmission of all segments. The solution presented herein, however, is likewise applicable if that is not the case, e.g., if the transport block would fit s2, s3, and s4, but not s5.

When the transmitter 20 forms a retransmission of an RLC SDU or RLC SDU segment, referred to herein as retransmission packets, retransmission PDUs, or PDUs, the transmitter 20 encapsulates the RLC SDU or RLC SDU segment in a RLC PDU, e.g., the transmitter 20 adds a header to the data part. The header sizes are defined in advance. In NR, exemplary header sizes include:
  12-bit SN (Sequence Number): 2 bytes fixed RLC header+2 bytes segmentation offset+2 bytes MAC (Medium Access Control) subheader=6 bytes
  18-bit SN: 3 bytes fixed RLC header+2 bytes segmentation offset+2 bytes MAC subheader=7 bytes
It will be appreciated that when the retransmission PDU contains the first byte segment of the RLC SDU segment, the header does not include segmentation offset bytes. Thus, the header size for a retransmission PDU that includes the first byte segment, e.g., s1, is smaller than the header size for a retransmission packet that does not include the first byte segment. Further, it is noted that in NR, the sequence number of the PDUs carrying segments of the same SDU is the same (unlike LTE). In the example above, the RLC SDU can thus be assumed to be associated with a single sequence number (SN). In one embodiment of the solution presented herein (e.g., an embodiment specific to NR), the method below is thus applicable only to RLC SDU segments belonging to the same SN.

There are multiple options (options 1-3 in the example of FIG. 2) on how the transmitter 20 retransmits the data bytes of the segments, e.g., to form RLC PDUs for the retransmission of the RLC SDU data. Thereby, SO_START refers to the segment offset (SO) considered in the PDU, e.g., the first byte of the full SDU that is included in the PDU, and SO_END to the last byte of the SDU included in the PDU.
  Option 1: each NACKed SDU is retransmitted in separate PDUs
    PDU 1: s2_SO_START, s2_SO_END
    PDU 2: s3_SO_START, s3_SO_END
    PDU 3: s5_SO_START, s5_SO_END
  Option 2: adjacent NACKed SDUs are combined/concatenated into one PDU for retransmission, e.g., combine/concatenate s2 and s3 into one PDU, send s5 separately in another PDU
    PDU 1: SN=3, s2_SO_START, s3_SO_END
    PDU 2: SN=3, s5_SO_START, S5_SO_END
  Option 3: combine/concatenate all NACKed SDUs, including any gap SDUs into one PDU for retransmission, e.g., combine/concatenate s2, s3, and s5, including also s4
    PDU 1: s2_SO_START, s5_SO_END
The transmitter 20 may act according to option 1, e.g., always retransmit separate PDUs according to previously sent segments, or according to SO_START, SO_END fields indicated in the RLC status report as NACKed segments. To reduce overhead, however, the solution presented herein enables the transmitter 20 to alternatively combine/concatenate multiple segments for retransmission, e.g., according to option 2 or option 3. For example, transmitter 20 may act according to option 2, e.g., combines/concatenates all consecutive/adjacent NACKed segments into a new PDU for retransmission. Alternatively, the transmitter 20 may act according to option 3, e.g., always combines/concatenates the NACKed segments including also one or multiple "gaps," e.g., segments for which no NACK has been received yet. It is noted that the "gap" may also be the last remaining segment at the end of the RLC SDU that fits into the transport block. For example, s2-s4 fit into the transport block but s5 does not, in this case, s4 is also considered a "gap" and is combined with other segments for retransmission.

According to the solution presented herein, the transmitter 20 decides between the various options, e.g., between options 1, 2, and 3 mentioned above for the example of FIG. 2, depending on the size of the gap. For example, if the header size introduced by option 1 or 2 in comparison with option 3 is higher than or equal to the remaining segment size of the gap segment(s), e.g., the not yet NACKed segment (segment 4 in the example above), transmitter 20 may choose option 3 instead of option 1 or 2.

In a variant embodiment, the transmitter 20 may consider an additional offset in the comparison, e.g., the transmitter chooses option 3 if the header size of option 1 or 2 minus a configurable offset in bytes exceeds the segment size of the gap segment(s), e.g., the not yet NACKed segments. The offset may reflect that the remaining segments that are not NACKed are NACKed anyway later on, or an expectation of such, and thus would have needed to be retransmitted later on as well. Thus, it may be more efficient to immediately retransmit them.

In a further embodiment, not only NACKed segments are concatenated, but also previously unsent segments. With respect to the example above, assume the transmitter 20 has not yet transmitted s5. In this example, the transmitter 20 may decide when receiving NACKs for some of the segments, e.g., s2 and s3, to form a single RLC PDU for retransmission of s2 and s3, and also include s4 and s5. This behavior can be conditioned as described above, e.g., choosing the option with the lowest header overhead. In other words, the transmitter 20 applies the RLC segment concatenation not only to NACKed segments, but also to not yet NACKed segments, and furthermore also to unsent segments.

The following shows how 3GPP TS 38.322 may be modified in accordance with the solution presented herein. Modifications are underlined, and "CONDITION" may be replaced by one of the conditions for re-concatenation described above. For example, the solution presented herein may be implemented "if needed," where according to the solution presented herein, the concatenation of the RLC SDU segments is "needed" if one of the described conditions above is met.

5.3 ARQ (Automatic Repeat reQuest) procedures
5.3.1 General
    ARQ procedures are only performed by an AM RLC entity.
5.3.2 Retransmission
    The transmitting side of an AM RLC entity can receive a negative acknowledgement (notification of reception failure by its peer AM RLC entity) for an RLC SDU or an RLC SDU segment by the following: STATUS PDU from its peer AM RLC entity.
    When receiving a negative acknowledgement for an RLC SDU or an RLC SDU segment by a STATUS PDU from its peer AM RLC entity, the transmitting side of the AM RLC entity shall:
        if the SN of the corresponding RLC SDU falls within the range TX_Next_Ack<=SN<TX_Next:
            consider the RLC SDU or the RLC SDU segment for which a negative acknowledgement was received for retransmission.
    When an RLC SDU or an RLC SDU segment is considered for retransmission, the transmitting side of the AM RLC entity shall:
        if the RLC SDU or RLC SDU segment is considered for retransmission for the first time:
            set the RETX_COUNT associated with the RLC SDU to zero.
        else, if it (the RLC SDU or the RLC SDU segment that is considered for retransmission) is not pending for retransmission already and the RETX_COUNT associated with the RLC SDU has not been incremented due to another negative acknowledgment in the same STATUS PDU:
            increment the RETX_COUNT.
        if RETX_COUNT=maxRetxThreshold:
            indicate to upper layers that max retransmission has been reached.
    When retransmitting an RLC SDU or an RLC SDU segment, the transmitting side of an AM RLC entity shall:
        if needed, segment the RLC SDU or the RLC SDU segment;
        if CONDITION is met, concatenate the RLC SDU segments, for which a negative acknowledgement was received.
        form a new AM Data (AMD) PDU which will fit within the total size of AMD PDU(s) indicated by lower layer at the particular transmission opportunity;
        submit the new AMD PDU to lower layer.
    When forming a new AMD PDU, the transmitting side of an AM RLC entity shall:
        only map the original RLC SDU or RLC SDU segment to the Data field of the new AMD PDU;
        modify the header of the new AMD PDU in accordance with the description in sub clause 6.2.1.4;
        set the P field according to sub clause 5.3.3.

As noted above, in response to receiving the transmitted segments, the receiver 30 generates and sends a NACK to negatively acknowledge receipt or an acknowledgement (ACK) to acknowledge receipt for each transmitted segment. The receiver 30 may send such ACKs/NACKs as part of a status report. In some embodiments, the receiver 30 may also log which bytes of a particular SDU have been successfully received, e.g., which bytes of an SDN identified by a particular sequence number (SN) have been received. Each subsequently received PDU that does not include the first segment includes, in addition to the SN, the segmentation offset field and the MAC subheader. The segmentation offset field defines to which byte index of the SDU the payload of the PDU belongs, while the MAC subheader enables the receiver 30 to determine the size of the PDU, and thus the number of payload bytes included in the PDU. The receiver 30 then waits for the expected retransmitted segments, and uses the header to interpret what segments of the SDU have been included in the retransmission. In the case where the first segment is included in the retransmission, the receiver 30 relies only on the MAC subheader to determine the size of the PDU, and thus to determine how many of the segments are included in the PDU (in addition to the first segment). For example, consider the example of FIG. 2, where the transmitter has transmitted all five segments (s1-s5). When the receiver 30 receives the first segment (s1), but does not correctly receive the remaining four segments (s2-s5), the receiver 30 indicates as such by sending a status report indicating a NACK for S2-s5. The transmitter 20 may then implement the solution presented herein to combine some of the NACKed segments for retransmission. For example, the transmitter may combine s3 and s4 into one retransmission PDU. In this case, the receiver 30 receives a retransmission PDU indicating a segmentation offset 2 and a payload length of 2. An offset of "2" indicates at least s3 is included in the retransmission PDU, and a payload length of "2" indicates s3 and s4 are included in the retransmission PDU. Assuming the receiver 30 correctly receives this retransmission PDU, the receiver 30 in this example has now safely received s1, s3, and s4. The receiver 30 may then send another status report indicating a NACK for s2 and s5. According to the solution presented herein, the transmitter then determines whether to retransmit s2 and s5 in separate PDUs, or whether to retransmit S2-S5 in one combined PDU. For example, if the size of s3 and s4 is less than the size of the header used for retransmitting one of the segments, e.g., s5, then the transmitter 20 may combine s2-s5 into a retransmission PDU, where the header for this retransmission would indicate a segment offset of 2 and a payload length of 4.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 1606, network nodes 1660 and 1660*b*, and WDs 1610, 1610*b*, and 1610*c*. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2nd Generation (2G), 3rd Generation (3G), 4th Generation (4G), or 5th Generation (5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, E-UTRAN (Evolved UMTS Terrestrial Radio Access Network) Node Bs (eNBs), and Next Generation Node Bs (NR Node B or gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as Radio Network Controllers (RNCs) or base station controllers (BSCs), base transceiver stations (BTSs), transmission points, transmission nodes, multi-cell/multicast coordination entities (MCEs), core network nodes (e.g., MSCs, MMEs), Operation and Maintenance (O&M) nodes, Operations Support System (OSS) nodes, Self Optimization Network (SON) nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeBs. In such a scenario, each unique NodeB and RNC pair may in some instances be considered a single separate network node. In some embodiments, network node 1660 may be configured to support multiple Radio Access Technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signaling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692; instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals 1665. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 8 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprises one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc.

The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

Figure 9:
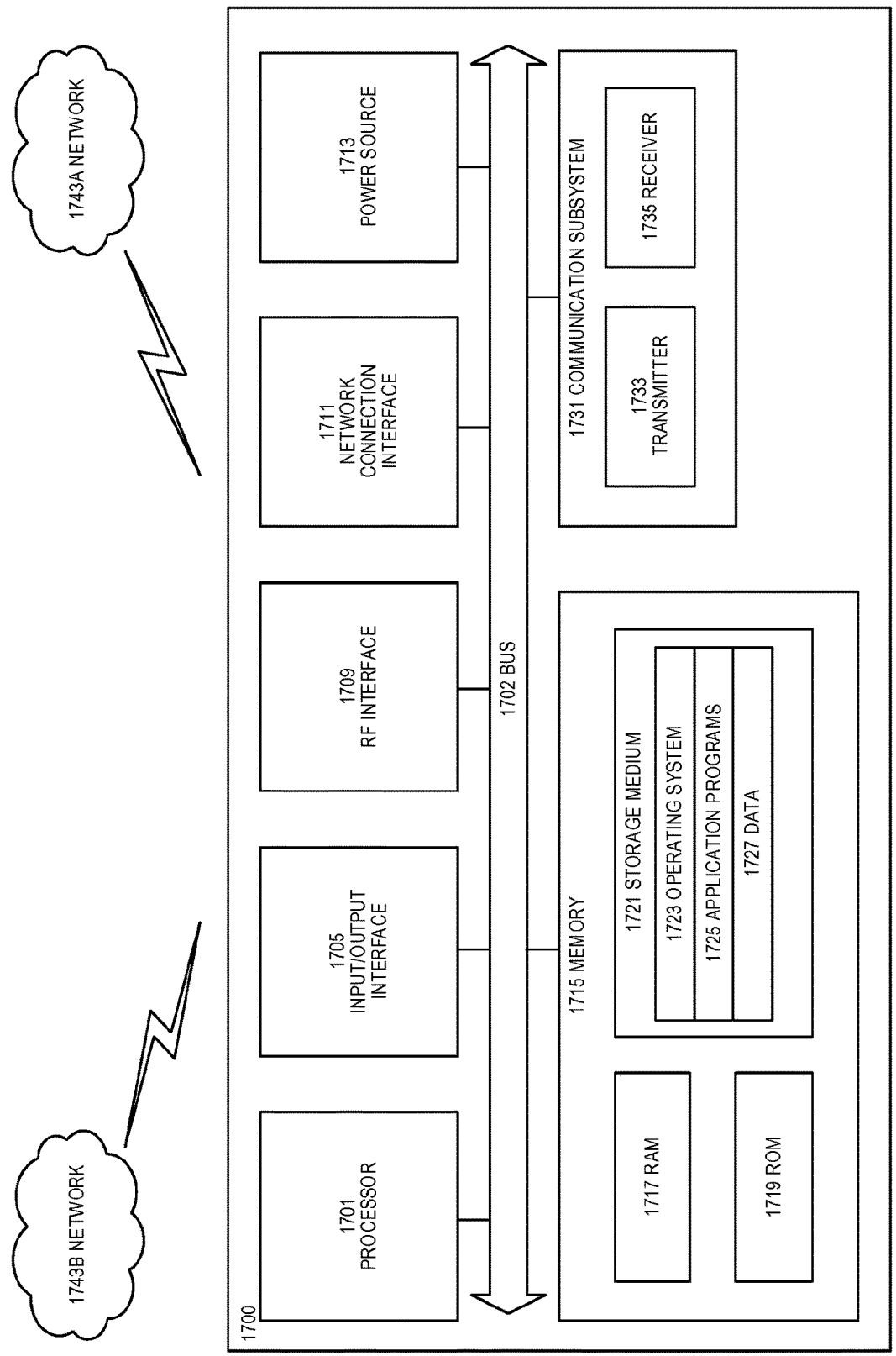
FIG. 9 shows an exemplary UE applicable to the solution presented herein.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1720 may be any UE identified by the 3rd Generation Partnership Project (3GPP), including a NB-IoT UE, a machine type communication (MTC) UE, and/or an enhanced MTC (eMTC) UE. UE 1700, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 1709 may be configured to provide a communication interface to RF components such as a transmitter, a receiver, and an antenna. Network connection interface 1711 may be configured to provide a communication interface to network 1743a. Network 1743a may encompass wired and/or wireless networks such as a local-area network (LAN), a wide-area network (WAN), a computer network, a wireless network, a telecommunications network, another like network or any combination thereof. For example, network 1743a may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 9, processing circuitry 1701 may be configured to communicate with network 1743*b* using communication subsystem 1731. Network 1743*a* and network 1743*b* may be the same network or networks or different network or networks. Communication subsystem 1731 may be configured to include one or more transceivers used to communicate with network 1743*b*. For example, communication subsystem 1731 may be configured to include one or more transceivers used to communicate with one or more remote transceivers of another device capable of wireless communication such as another WD, UE, or base station of a Radio Access Network (RAN) according to one or more communication protocols, such as IEEE 802.12, Code Division Multiplexing Access (CDMA), Wide CDMA (WCDMA), Global System for Mobile Communications (GSM), LTE, UTRAN, Worldwide Interoperability for Microwave Access (WiMax), or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743*b* may encompass wired and/or wireless networks such as a local-area network (LAN), a wide-area network (WAN), a computer network, a wireless network, a telecommunications network, another like network or any combination thereof. For example, network 1743*b* may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 10:
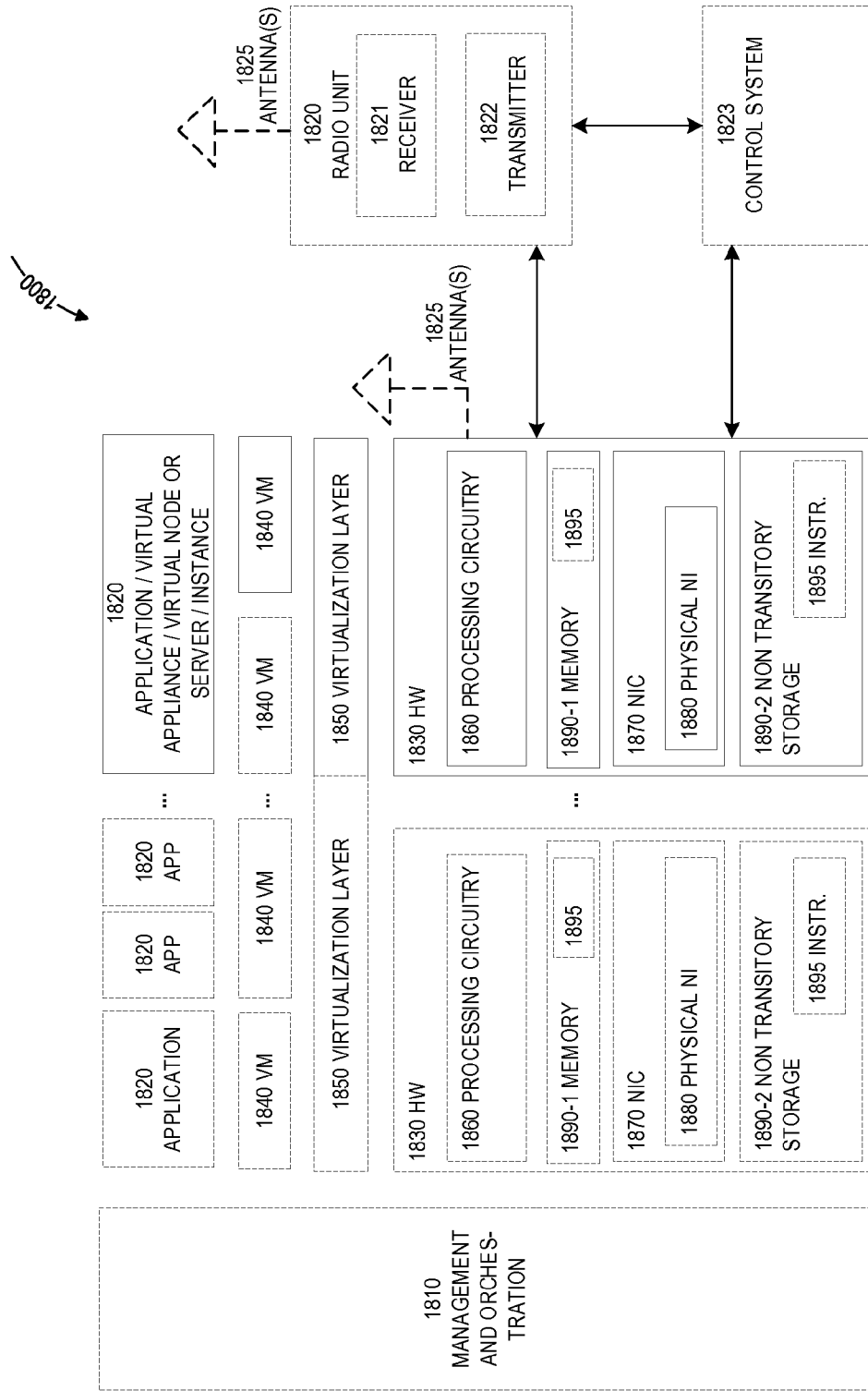
FIG. 10 shows an exemplary virtualization environment applicable to the solution presented herein.

FIG. 10 is a schematic block diagram illustrating a virtualization environment 1800 in which functions implemented by some embodiments may be virtualized. In the present context, virtualizing means creating virtual versions of apparatuses or devices, which may include virtualizing hardware platforms, storage devices, and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 10, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 1810, which, among others, oversees lifecycle management of applications 1820.

Virtualization of the hardware is in some contexts referred to as Network Function Virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 10.

In some embodiments, one or more radio units 1820 that each include one or more transmitters 1822 and one or more receivers 1821 may be coupled to one or more antennas 1825. Radio units 1820 may communicate directly with hardware nodes 1830 via one or more appropriate network interfaces and may be used in combination with the virtual components to provide a virtual node with radio capabilities, such as a radio access node or a base station.

In some embodiments, some signaling can be effected with the use of control system 1823 which may alternatively be used for communication between the hardware nodes 1830 and radio units 1820.

Figure 11:
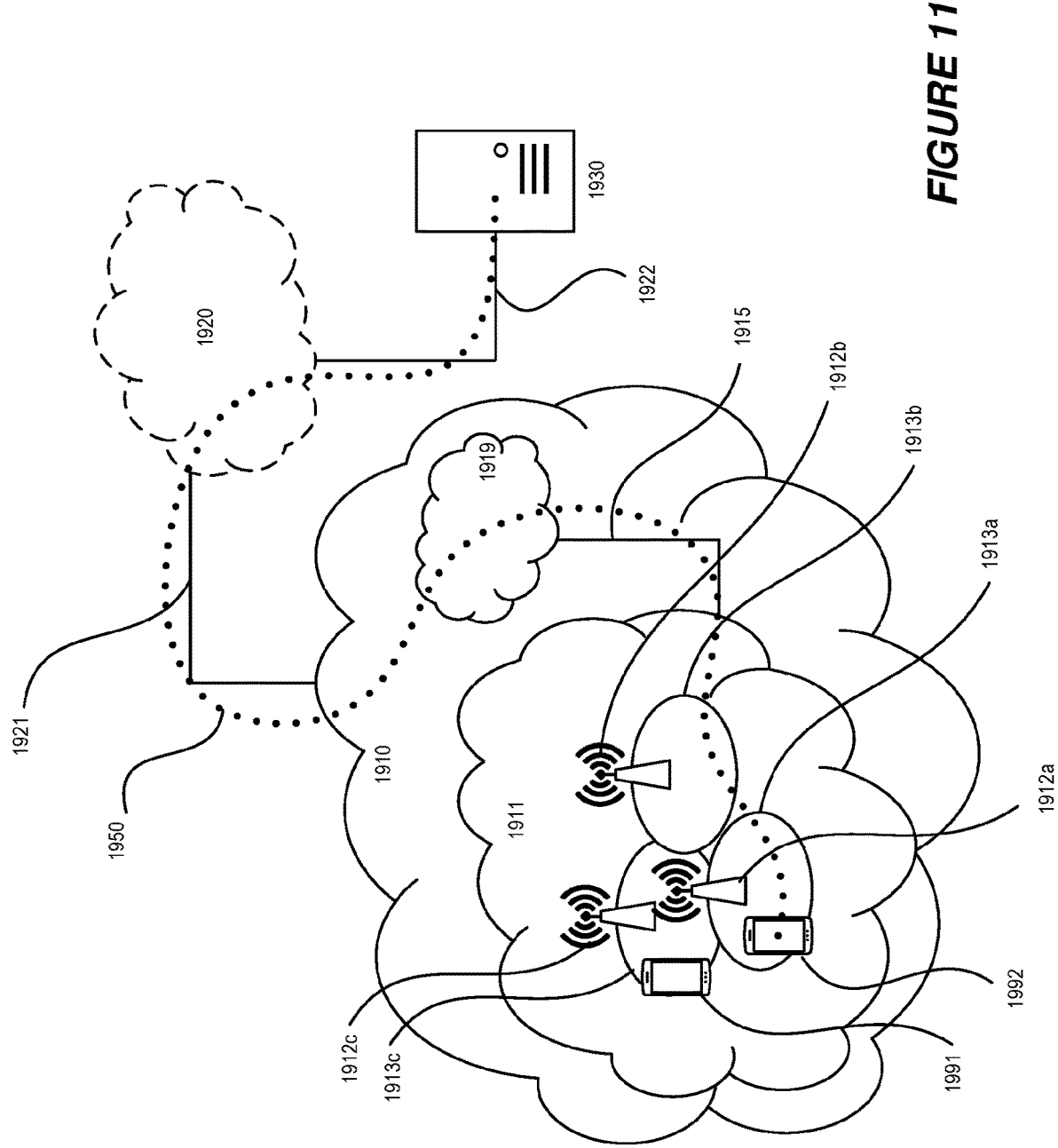
FIG. 11 shows an exemplary telecommunications network applicable to the solution presented herein.

FIG. 11 illustrates a telecommunication network connected via an intermediate network to a host computer in accordance with some embodiments. In particular, with reference to FIG. 11, in accordance with an embodiment, a communication system includes telecommunication network 1910, such as a 3GPP-type cellular network, which comprises access network 1911, such as a radio access network, and core network 1914. Access network 1911 comprises a plurality of base stations 1912*a*, 1912*b*, 1912*c*, such as NBs, eNBs, gNBs or other types of wireless access points, each defining a corresponding coverage area 1913*a*, 1913*b*, 1913*c*. Each base station 1912*a*, 1912*b*, 1912*c* is connectable to core network 1914 over a wired or wireless connection 1915. A first UE 1991 located in coverage area 1913*c* is configured to wirelessly connect to, or be paged by, the corresponding base station 1912*c*. A second UE 1992 in coverage area 1913*a* is wirelessly connectable to the corresponding base station 1912*a*. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server, or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 11 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 12:
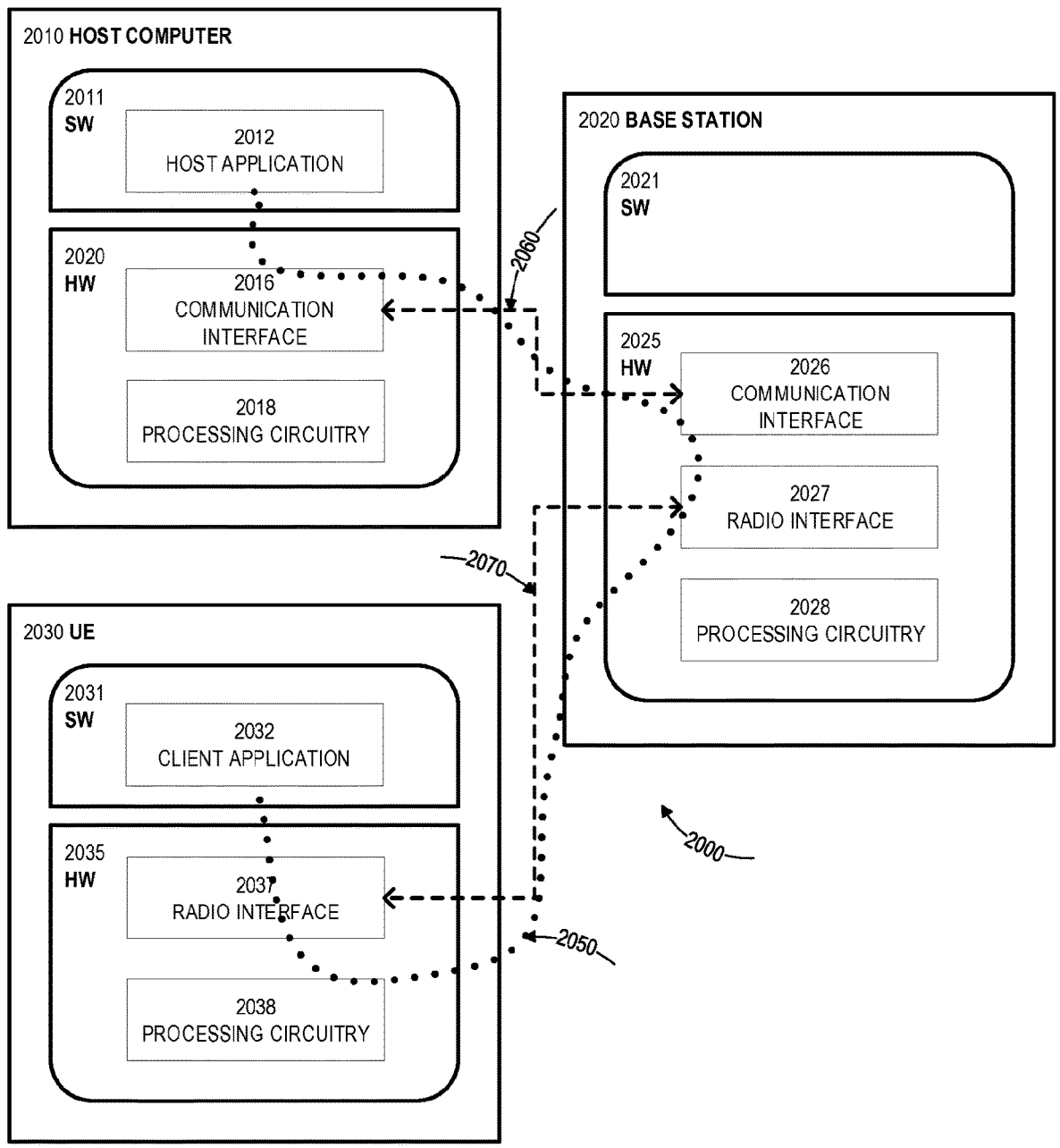
FIG. 12 shows an exemplary host computer applicable to the solution presented herein.

Example implementations, in accordance with an embodiment, of the UE, base station and host computer discussed in the preceding paragraphs will now be described with reference to FIG. 12. FIG. 12 illustrates host computer communicating via a base station with a user equipment over a partially wireless connection in accordance with some embodiments In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 12) served by base station 2020. Communication interface 2026 may be configured to facilitate connection 2060 to host computer 2010. Connection 2060 may be direct or it may pass through a core network (not shown in FIG. 12) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 12 may be similar or identical to host computer 2030, one of base stations 2012a, 2012b, 2012c and one of UEs 2091, 2092 of FIG. 12, respectively. This is to say, the inner workings of these entities may be as shown in FIG. 12 and independently, the surrounding network topology may be that of FIG. 12.

In FIG. 12, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or by supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 13:
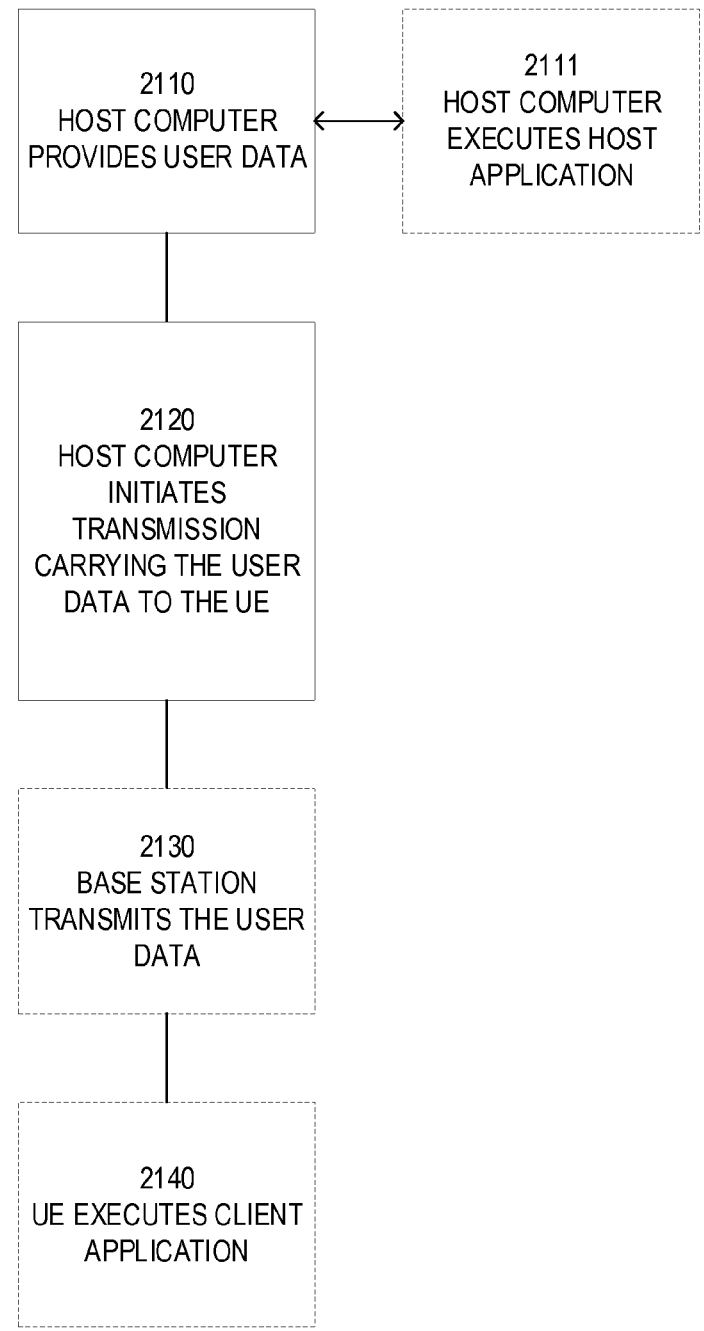
FIG. 13 shows an exemplary method implemented in a communication system in accordance with embodiments of the solution presented herein.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 14:
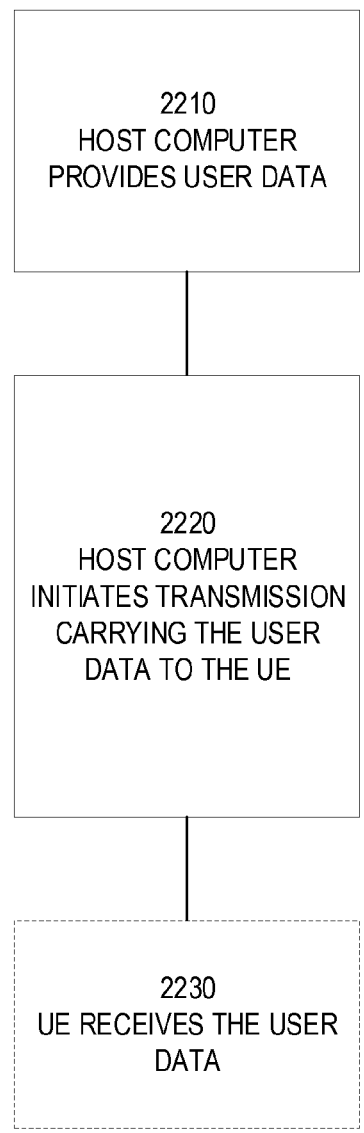
FIG. 14 shows another exemplary method implemented in a communication system in accordance with embodiments of the solution presented herein.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 15:
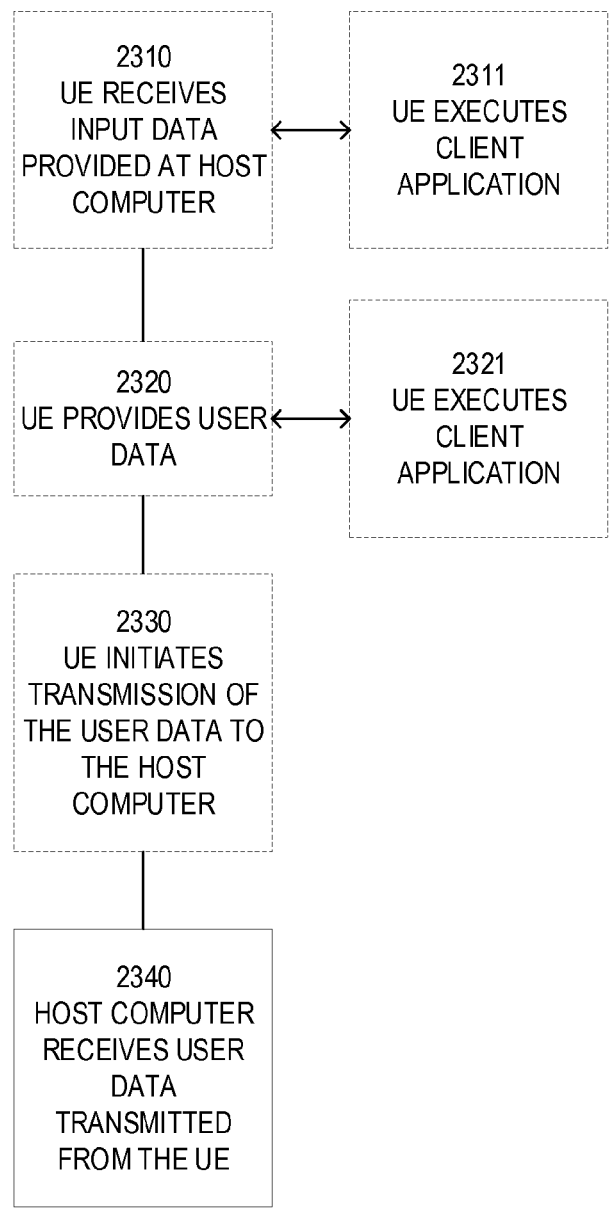
FIG. 15 shows another exemplary method implemented in a communication system in accordance with embodiments of the solution presented herein.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

Figure 16:
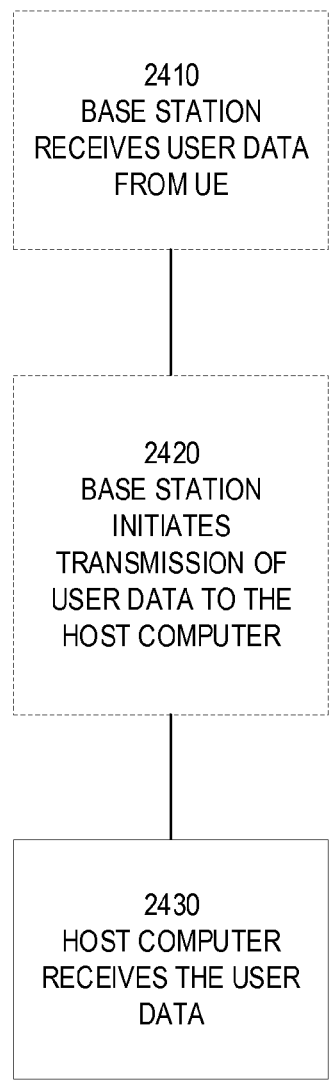
FIG. 16 shows another exemplary method implemented in a communication system in accordance with embodiments of the solution presented herein.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Group A Embodiments

1. A method performed by a transmitter for transmitting a Radio Link Protocol (RLC) Service Data Unit (SDU) to a receiver in wireless communication with the transmitter, the method comprising transmitting a plurality of segments to the receiver, each of said segments comprising one or more bytes of the SDU; receiving at least one NACK from the receiver identifying a corresponding negatively acknowledged segment, wherein each negatively acknowledged segment comprises one of the plurality of transmitted segments for which the transmitter received the NACK; identifying a gap segment adjacent to at least one of the negatively acknowledged segments, said gap segment comprising at least one non-negatively acknowledged segment; generating at least one retransmission packet responsive to a size of the gap segment, each of the at least one retransmission packets comprising a header and at least one of the negatively acknowledged segments; and transmitting the at least one retransmission packet to the receiver.

2. The method of embodiment 1 wherein receiving the at least one NACK comprises receiving a first NACK identifying a first negatively acknowledged segment for the SDU; and receiving a second NACK identifying a second negatively acknowledged segment for the SDU; wherein the first and second negatively acknowledged segments are adjacent to, and spaced within the SDU by, the gap segment.

3. The method of embodiment 2 wherein generating the at least one retransmission packet comprises generating a retransmission packet comprising the header, the gap segment, and the first and second negatively acknowledged segments when a size of the header exceeds the size of the gap segment.

4. The method of embodiment 2 further comprising reducing a size of the header by an offset to determine a reduced header size, wherein generating the at least one retransmission packet comprises generating a retransmission packet comprising the header, the gap segment, and the first and second negatively acknowledged segments when the reduced header size exceeds the size of the gap segment.

5. The method of embodiment 2 wherein the first negatively acknowledged segment corresponds to a first segment of the SDU and the second negatively acknowledged segment corresponds to any other segment of the SDU; a first header associated with a retransmission of the first negatively acknowledged segment has a first header size and a second header associated with a separate retransmission of the second negatively acknowledged segment has a second header size larger than the first header size; and generating the at least one retransmission packet comprises generating a retransmission packet comprising the first header, the gap segment, and the first and second negatively acknowledged segments when the second header size exceeds the size of the gap segment.

6. The method of embodiment 1 wherein receiving the at least one NACK comprises receiving a first NACK identifying a first negatively acknowledged segment of the SDU; receiving a second NACK identifying a second negatively acknowledged segment of the SDU adjacent the first negatively acknowledged segment and adjacent the gap segment; and receiving a third NACK identifying a third negatively acknowledged segment of the SDU adjacent to the gap segment; wherein the second and third negatively acknowledged segments are spaced within the SDU by the gap segment.

7. The method of embodiment 6 wherein generating the at least one retransmission packet comprises generating a retransmission packet comprising the header, the gap segment, and the first, second, and third negatively acknowledged segments when a size of the header exceeds the size of the gap segment; and generating first and second retransmission packets when the size of the gap segment exceeds the size of the header, said first retransmission packet comprising the header and the first and second negatively acknowledged segments and said second retransmission packet comprising the header and the third negatively acknowledged segment.

8. The method of embodiment 6 wherein the first negatively acknowledged segment corresponds to a first segment of the SDU and the second and third negatively acknowledged segments correspond to any other segments of the SDU; a first header associated with a retransmission of the first negatively acknowledged segment has a first header size and a second header associated with a separate retransmission of the second or third negatively acknowledged segments has a second header size larger than the first header size; and generating the at least one retransmission packet comprises generating a retransmission packet comprising the first header, the gap segment, and the first, second, and third negatively acknowledged segments when the second header size exceeds the size of the gap segment; and generating first and second retransmission packets when the size of the gap segment exceeds the second header size, said first retransmission packet comprising the first header and the first and second negatively acknowledged segments and said second retransmission packet comprising the second header and the third negatively acknowledged segment.

9. The method of embodiment 1 wherein the gap segment is between the negatively acknowledged segment and the end of the SDU.

10. The method of embodiment 9 wherein the gap segment comprises at least one segment that has not yet been acknowledged or negatively acknowledged; the transmitter anticipates that the at least one segment in the gap segment that has not yet been acknowledged or negatively acknowledged will be negatively acknowledged; and generating the at least one retransmission packet further comprises generating the at least one retransmission packet comprising the header, the gap segment, and the at least one of the negatively acknowledged segments responsive to the anticipation.

11. The method of embodiment 1 wherein the gap segment includes a first segment of the SDU and wherein each negatively acknowledged segment comprises one of the plurality of segments following the first segment of the SDU.

12. The method of embodiment 11 wherein a first header associated with a retransmission including the first segment has a first header size and a second header associated with a separate retransmission that does not include the first segment has a second header size larger than the first header size, and wherein generating the at least one retransmission packet comprises generating a retransmission packet comprising the first header, the gap segment, and one or more of the negatively acknowledged segments when the second header size exceeds the size of the gap segment; and generating a retransmission packet comprising the second header and one or more of the negatively acknowledged segments when the size of the gap segment exceeds the second header size.

13. The method of embodiment 1 wherein generating the at least one retransmission packet comprises generating a retransmission packet comprising two or more negatively acknowledged segments when a size of the header exceeds the size of the gap segment, wherein two of the two or more negatively acknowledged segments are adjacent to and separated by the gap segment.

14. The method of embodiment 1 wherein each of the at least one non-negatively acknowledged segments of the gap segment comprises a not yet transmitted segment of the SDU, an already acknowledged segment of the SDU, or a transmitted segment of the SDU that has not yet been acknowledged or negatively acknowledged.

15. The method of embodiment 1 wherein the gap segment comprises at least one segment that has not yet been acknowledged or negatively acknowledged; the transmitter anticipates that the at least one segment in the gap segment that has not yet been acknowledged or negatively acknowledged will be negatively acknowledged; and generating the at least one retransmission packet further comprises generating the at least one retransmission packet comprising the header, the gap segment, and the at least one of the negatively acknowledged segments responsive to the anticipation.

16. The method of embodiment 1 wherein the transmitter is comprised in a wireless device.

17. The method of embodiment 1 wherein the transmitter is comprised in a base station.

AA. The method of any of the previous embodiments, further comprising providing user data; and forwarding the user data to a host computer via the transmission to the base station.

Group B Embodiments

B1. A transmitter in a wireless device configured to perform any of the steps of any of the Group A embodiments.

B2. A transmitter in a wireless device, the transmitter comprising processing circuitry configured to perform any of the steps of any of the Group A embodiments; and power supply circuitry configured to supply power to the wireless device.

B3. A transmitter in a wireless device, the transmitter comprising processing circuitry and memory, the memory containing instructions executable by the processing circuitry whereby the transmitter is configured to perform any of the steps of any of the Group A embodiments.

B4. A user equipment (UE) comprising an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

B5. A computer program comprising instructions which, when executed by at least one processor of a wireless device, causes the wireless device to carry out the steps of any of the Group A embodiments.

B6. A carrier containing the computer program of embodiment B5, wherein the carrier is one of an electronic signal, optical signal, radio signal, or computer readable storage medium.

B7. A transmitter in a base station configured to perform any of the steps of any of the Group A embodiments.

B8. A transmitter in a base station, the transmitter comprising processing circuitry configured to perform any of the steps of any of the Group A embodiments; power supply circuitry configured to supply power to the base station.

B9. A transmitter in a base station, the transmitter comprising processing circuitry and memory, the memory containing instructions executable by the processing circuitry whereby the transmitter is configured to perform any of the steps of any of the Group A embodiments.

B10. A computer program comprising instructions which, when executed by at least one processor of a base station, causes the base station to carry out the steps of any of the Group A embodiments.

B11. A carrier containing the computer program of embodiment B10, wherein the carrier is one of an electronic signal, optical signal, radio signal, or computer readable storage medium.

Group C Embodiments

C1. A communication system including a host computer comprising processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group A embodiments.

C2. The communication system of the pervious embodiment further including the base station.

C3. The communication system of the previous 2 embodiments, further including the UE, wherein the UE is configured to communicate with the base station.

C4. The communication system of the previous 3 embodiments, wherein the processing circuitry of the host computer is configured to execute a host application, thereby providing the user data; and the UE comprises processing circuitry configured to execute a client application associated with the host application.

C5. A method implemented in a communication system including a host computer, a base station, and a user equipment (UE), the method comprising at the host computer, providing user data; and at the host computer, initiating a transmission carrying the user data to the UE via a cellular network comprising the base station, wherein the base station performs any of the steps of any of the Group A embodiments.

C6. The method of the previous embodiment, further comprising, at the base station, transmitting the user data.

C7. The method of the previous 2 embodiments, wherein the user data is provided at the host computer by executing a host application, the method further comprising, at the UE, executing a client application associated with the host application.

C8. A user equipment (UE) configured to communicate with a base station, the UE comprising a radio interface and processing circuitry configured to perform any of the previous 3 embodiments.

C9. A communication system including a host computer comprising processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

C10. The communication system of the previous embodiment, wherein the cellular network further includes a base station configured to communicate with the UE.

C11. The communication system of the previous 2 embodiments, wherein the processing circuitry of the host computer is configured to execute a host application, thereby providing the user data; and the UE's processing circuitry is configured to execute a client application associated with the host application.

C12. A method implemented in a communication system including a host computer, a base station and a user equipment (UE), the method comprising at the host computer, providing user data; and at the host computer, initiating a transmission carrying the user data to the UE via a cellular network comprising the base station, wherein the UE performs any of the steps of any of the Group A embodiments.

C13. The method of the previous embodiment, further comprising at the UE, receiving the user data from the base station.

C14. A communication system including a host computer comprising communication interface configured to receive user data originating from a transmission from a user equipment (UE) to a base station, wherein the UE comprises a radio interface and processing circuitry, the UE's processing circuitry configured to perform any of the steps of any of the Group A embodiments.

C15. The communication system of the previous embodiment, further including the UE.

C16. The communication system of the previous 2 embodiments, further including the base station, wherein the base station comprises a radio interface configured to communicate with the UE and a communication interface configured to forward to the host computer the user data carried by a transmission from the UE to the base station.

C17. The communication system of the previous 3 embodiments, wherein the processing circuitry of the host computer is configured to execute a host application; and the UE's processing circuitry is configured to execute a client application associated with the host application, thereby providing the user data.

C18. The communication system of the previous 4 embodiments, wherein the processing circuitry of the host computer is configured to execute a host application, thereby providing request data; and the UE's processing circuitry is configured to execute a client application associated with the host application, thereby providing the user data in response to the request data.

C19. A method implemented in a communication system including a host computer, a base station, and a user equipment (UE), the method comprising at the host computer, receiving user data transmitted to the base station from the UE, wherein the UE performs any of the steps of any of the Group A embodiments.

C20. The method of the previous embodiment, further comprising, at the UE, providing the user data to the base station.

C21. The method of the previous 2 embodiments, further comprising at the UE, executing a client application, thereby providing the user data to be transmitted; and at the host computer, executing a host application associated with the client application.

C22. The method of the previous 3 embodiments, further comprising at the UE, executing a client application; and at the UE, receiving input data to the client application, the input data being provided at the host computer by executing a host application associated with the client application, wherein the user data to be transmitted is provided by the client application in response to the input data.

C23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group A embodiments.

C24. The communication system of the previous embodiment further including the base station.

C25. The communication system of the previous 2 embodiments, further including the UE, wherein the UE is configured to communicate with the base station.

C26. The communication system of the previous 3 embodiments, wherein the processing circuitry of the host computer is configured to execute a host application; the UE is configured to execute a client application associated with the host application, thereby providing the user data to be received by the host computer.

C27. A method implemented in a communication system including a host computer, a base station and a user equipment (UE), the method comprising at the host computer, receiving, from the base station, user data originating from a transmission which the base station has received from the UE, wherein the UE performs any of the steps of any of the Group A embodiments.

C28. The method of the previous embodiment, further comprising at the base station, receiving the user data from the UE.

C29. The method of the previous 2 embodiments, further comprising at the base station, initiating a transmission of the received user data to the host computer.

What is claimed is:

1. A method performed by a transmitter for transmitting a Radio Link Protocol (RLC) Service Data Unit (SDU) to a receiver in wireless communication with the transmitter, the method comprising:
   transmitting a plurality of segments to the receiver, each of said segments comprising one or more bytes of the SDU;
   receiving at least one NACK from the receiver identifying a corresponding negatively acknowledged segment, wherein each negatively acknowledged segment comprises one of the plurality of transmitted segments for which the transmitter received the NACK;
   identifying a gap segment adjacent to at least one of the negatively acknowledged segments, said gap segment comprising at least one non-negatively acknowledged segment;
   generating at least one retransmission packet responsive to a size of the gap segment, each of the at least one retransmission packets comprising a header and at least one of the negatively acknowledged segments; and
   transmitting the at least one retransmission packet to the receiver.

2. The method of claim 1 wherein said receiving the at least one NACK comprises:
   receiving a first NACK identifying a first negatively acknowledged segment for the SDU; and
   receiving a second NACK identifying a second negatively acknowledged segment for the SDU;
   wherein the first and second negatively acknowledged segments are adjacent to, and spaced within the SDU by, the gap segment.

3. The method of claim 2 wherein said generating the at least one retransmission packet comprises generating a retransmission packet comprising the header, the gap segment, and the first and second negatively acknowledged segments when a size of the header exceeds the size of the gap segment.

4. The method of claim 2 further comprising reducing a size of the header by an offset to determine a reduced header with a reduced header size, wherein said generating the at least one retransmission packet comprises generating a retransmission packet comprising the reduced header, the gap segment, and the first and second negatively acknowledged segments when the reduced header size exceeds the size of the gap segment.

5. The method of claim 2 wherein:
the first negatively acknowledged segment corresponds to a first segment of the SDU and the second negatively acknowledged segment corresponds to any other segment of the SDU;
a first header associated with a retransmission of the first negatively acknowledged segment has a first header size and a second header associated with a separate retransmission of the second negatively acknowledged segment has a second header size larger than the first header size; and
said generating the at least one retransmission packet comprises generating a retransmission packet comprising the first header, the gap segment, and the first and second negatively acknowledged segments when the second header size exceeds the size of the gap segment.

6. The method of claim 1 wherein said receiving the at least one NACK comprises:
receiving a first NACK identifying a first negatively acknowledged segment of the SDU;
receiving a second NACK identifying a second negatively acknowledged segment of the SDU adjacent to the first negatively acknowledged segment and adjacent to the gap segment; and
receiving a third NACK identifying a third negatively acknowledged segment of the SDU adjacent to the gap segment;
wherein the second and third negatively acknowledged segments are spaced within the SDU by the gap segment.

7. The method of claim 6 wherein said generating the at least one retransmission packet comprises:
generating a retransmission packet comprising the header, the gap segment, and the first, second, and third negatively acknowledged segments when a size of the header exceeds the size of the gap segment; and
generating first and second retransmission packets when the size of the gap segment exceeds the size of the header, said first retransmission packet comprising the header and the first and second negatively acknowledged segments and said second retransmission packet comprising the header and the third negatively acknowledged segment.

8. The method of claim 6 wherein:
the first negatively acknowledged segment corresponds to a first segment of the SDU, the second negatively acknowledged segment corresponds to a second segment of the SDU, and the third negatively acknowledged segment corresponds to any other segment of the SDU;
a first header associated with a retransmission of the first negatively acknowledged segment has a first header size and a second header associated with a separate retransmission of the second or third negatively acknowledged segments has a second header size larger than the first header size; and
said generating the at least one retransmission packet comprises:
generating a retransmission packet comprising the first header, the gap segment, and the first, second, and third negatively acknowledged segments when the second header size exceeds the size of the gap segment; and
generating first and second retransmission packets when the size of the gap segment exceeds the second header size, said first retransmission packet comprising the first header and the first and second negatively acknowledged segments and said second retransmission packet comprising the second header and the third negatively acknowledged segment.

9. The method of claim 1 wherein the gap segment is between the negatively acknowledged segment and the end of the SDU.

10. The method of claim 9 wherein:
the gap segment comprises at least one segment that has not yet been acknowledged or negatively acknowledged;
the transmitter anticipates that the at least one segment in the gap segment that has not yet been acknowledged or negatively acknowledged will be negatively acknowledged; and
said generating the at least one retransmission packet further comprises generating the at least one retransmission packet comprising the header, the gap segment, and the at least one of the negatively acknowledged segments responsive to the anticipation.

11. The method of claim 1 wherein the gap segment includes a first segment of the SDU and wherein each negatively acknowledged segment comprises one of the plurality of segments following the first segment of the SDU.

12. The method of claim 11 wherein a first header associated with a retransmission including the first segment has a first header size and a second header associated with a separate retransmission that does not include the first segment has a second header size larger than the first header size, and wherein said generating the at least one retransmission packet comprises:
generating a retransmission packet comprising the first header, the gap segment, and one or more of the negatively acknowledged segments when the second header size exceeds the size of the gap segment; and
generating a retransmission packet comprising the second header and one or more of the negatively acknowledged segments when the size of the gap segment exceeds the second header size.

13. The method of claim 1 wherein said generating the at least one retransmission packet comprises generating a retransmission packet comprising two or more negatively acknowledged segments when a size of the header exceeds the size of the gap segment, wherein two of the two or more negatively acknowledged segments are adjacent to and separated by the gap segment.

14. The method of claim 1 wherein each of the at least one non-negatively acknowledged segments of the gap segment comprises a not yet transmitted segment of the SDU, an already acknowledged segment of the SDU, or a transmitted segment of the SDU that has not yet been acknowledged or negatively acknowledged.

15. The method of claim 1 wherein:
the gap segment comprises at least one segment that has not yet been acknowledged or negatively acknowledged;
the transmitter anticipates that the at least one segment in the gap segment that has not yet been acknowledged or negatively acknowledged will be negatively acknowledged; and
said generating the at least one retransmission packet further comprises generating the at least one retransmission packet comprising the header, the gap segment, and the at least one of the negatively acknowledged segments responsive to the anticipation.

16. The method of claim 1 wherein the transmitter is comprised in a wireless device or is comprised in a network node.

17. A transmitter in wireless communication with a receiver, the transmitter comprising processing circuitry configured to:
- transmit a plurality of segments to the receiver, each of said segments comprising one or more bytes of a Service Data Unit (SDU);
- receive at least one NACK from the receiver identifying a corresponding negatively acknowledged segment, wherein each negatively acknowledged segment comprises one of the plurality of transmitted segments for which the transmitter received the NACK;
- identify a gap segment adjacent to at least one of the negatively acknowledged segments, said gap segment comprising at least one non-negatively acknowledged segment;
- generate at least one retransmission packet responsive to a size of the gap segment, each of the at least one retransmission packets comprising a header and at least one of the negatively acknowledged segments; and
- transmit the at least one retransmission packet to the receiver.

18. The transmitter of claim 17 wherein the transmitter is comprised in a wireless device or is comprised in a network node.

19. The transmitter of claim 17 wherein the transmitter is comprised in a network node.

20. A non-transitory computer-readable medium storing a computer program product for controlling a wireless transmitter, the computer program product comprising software instructions which, when run on at least one processing circuit in the wireless transmitter, causes the wireless transmitter to:
- transmit a plurality of segments to a receiver, each of said segments comprising one or more bytes of a Service Data Unit (SDU);
- receive at least one NACK from the receiver identifying a corresponding negatively acknowledged segment, wherein each negatively acknowledged segment comprises one of the plurality of transmitted segments for which the transmitter received the NACK;
- identify a gap segment adjacent to at least one of the negatively acknowledged segments, said gap segment comprising at least one non-negatively acknowledged segment;
- generate at least one retransmission packet responsive to a size of the gap segment, each of the at least one retransmission packets comprising a header and at least one of the negatively acknowledged segments; and
- transmit the at least one retransmission packet to the receiver.

* * * * *